United States Patent Office 2,736,746
Patented Feb. 28, 1956

2,736,746

DIAMINE COMPOUNDS

Moses Wolf Goldberg, Upper Montclair, and Sidney Teitel, Nutley, N. J., assignors to Hoffmann-La Roche Inc., Nutley, N. J., a corporation of New Jersey No Drawing. Application September 8, 1954, Serial No. 454,827

8 Claims. (Cl. 260—501)

This invention relates to tertiary amino alkyl derivatives of 1-methyl-3-(2,6,6-trimethyl-1-cyclohexen-1-yl)-propylamine and 2-methyl-4-(2,6,6-trimethyl-1-cyclohexen-1-yl)butylamine which are represented by the following general Formula I:

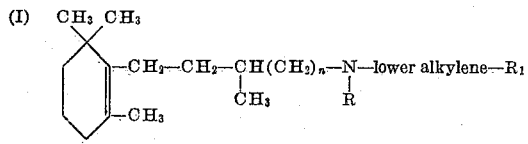

(I)

wherein

R represents hydrogen or an alkyl or acyl group,
$R_1$ represents a tertiary amino group, and
$n$ represents 0 or 1.

The term "lower alkylene" in the above formula refers to both straight chain and branched chain aliphatic hydrocarbon radicals. The alkyl radicals represented by R are preferably lower alkyl groups such as methyl, ethyl, propyl and the like. Acyl radicals represented by R include acetyl, propionyl, benzoyl, diphenylacetyl and the like. Tertiary amino groups represented by $R_1$ include dialkylamino radicals such as dimethylamino and saturated basic monocyclic 5- or 6-membered heterocyclic radicals such as piperidino, morpholino, pyrrolidino, etc.

The compounds of this invention can be produced by reductive amination of β-ionone or 4-(2,6,6-trimethyl-1-cyclohexen-1-yl)-2-methylbuten-2-al-1 with a diamine of the general Formula II:

(II)  $H_2N$—lower alkylene—$R_1$ in which lower alkylene and $R_1$ have the above defined meaning. According to an alternative method the compounds of this invention can be prepared starting from 1 - methyl - 3 - (2,6,6 - trimethyl - 1 - cyclohexen - 1-yl)propylamine or 2-methyl-4-(2,6,6-trimethyl-1-cyclohexen-1-yl)butylamine. These two amines can either be reductively condensed with an aldehyde of the general Formula III, or they can be alkylated with a tertiary aminoalkyl halide of the general Formula IV.

(III)  OHC—lower alkylene—$R_1$ (IV)  Halogen—lower alkylene—$R_1$

In Formulas III and IV lower alkylene and $R_1$ have the meaning specified above.

N-alkyl derivatives of the diamines thus obtained can be prepared by alkylation with a formaldehyde-formic acid mixture or by reduction of the corresponding N-acyl compounds with lithium aluminum hydride. The N-acyl derivatives of the diamines are obtained by reacting the diamine with an acid anhydride or an acyl halide.

2 - methyl-4-(2,6,6-trimethyl-1-cyclohexen-1 - yl)butylamine, which is a novel intermediate used in producing the new compounds, is obtained by reductive amination of 4-(2,6,6 - trimethyl-1-cyclohexen-1-yl)-2 - methylbuten-2-al-1 with ammonia in alcoholic solution in the presence of Raney nickel.

The novel amines form salts such as acid addition salts and quaternary salts. Acid addition salts are produced by reacting the base with an acid, such as the mineral acids, or a strong organic acid, such as oxalic acid, etc. Quaternary salts are prepared by reacting the base with a quaternizing agent, such as an alkyl halide or an aralkyl halide. Quaternary and acid addition salts containing either one or two anions are within the scope of this invention.

The compounds of this invention are useful as therapeutic agents, more particularly as antiprotozoan agents, e. g. to combat *Trichomonas vaginalis*, or antifungal agents, e. g. to combat *Trichophyton mentagrophytes* and *Microsporon lanosum*.

Example 1

155 grams (0.8 mol) of β-ionone and 214 grams (1.85 mol) of β-diethylaminoethylamine, dissolved in 400 ml. of ethanol, were hydrogenated in the presence of Raney nickel catalyst at 1500 p. s. i. and 60° C. The catalyst was filtered off, the alcohol was distilled off and the residual oil was fractionated in vacuo to obtain $N^2,N^2$-diethyl - $N^1$-[1-methyl-3-(2,6,6-trimethyl-1-cyclohexen-1-yl)-propyl]ethylenediamine, B. P.$_{0.4}$ 133° C., $n_D^{28}$=1.4723.

50 grams (0.17 mol) of the diamine obtained above was dissolved in 32.5 ml. (0.6 mol) of 90% formic acid and 16.2 ml. (0.19 mol) of 35% formaldehyde. The solution was stirred and refluxed for 3 hours. The solution was then concentrated under water vacuum. The syrupy residue was made strongly alkaline with 15% potassium hydroxide and the mixture was extracted with ether. The ether extract was washed with water and dried with potassium carbonate. The ether was distilled off and the residual oil was fractionally distilled to obtain $N^2,N^2$-diethyl - $N^1$ - methyl - $N^1$ - [1 - methyl - 3 - (2,6,6 - trimethyl - 1 - cyclohexen - 1 - yl) - propyl]ethylenediamine, B. P.$_{0.3}$ 135° C., $n_D^{23}$=1.4758.

Example 2

10 grams (0.032 mol) of $N^2,N^2$-diethyl-$N^1$-methyl-$N^1$-[1 - methyl-3-(2,6,6 - trimethyl-1-cyclohexen-1-yl)propyl]-ethylenediamine (obtained as in Example 1) were dissolved in 100 ml. of acetone containing 40% methyl bromide (by weight). The solution was stored at room temperature. After 48 hours, the white crystals that had formed were filtered off, washed with acetone and dried. The dimethobromide of $N^2,N^2$-diethyl-$N^1$-methyl-$N^1$-[1-methyl - 3 - (2,6,6 - trimethyl-1-cyclohexen-1-yl)propyl]-ethylenediamine dihydrate (after recrystallization from acetonitrile-ether) melted at 195–196° C. with decomposition.

Example 3

A solution of 11.8 grams (0.04 mol) of $N^2,N^2$-diethyl-$N^1$ - [1 - methyl - 3 - (2,6,6 - trimethyl - 1 - cyclohexen-1-yl)propyl]ethylenediamine (obtained as in Example 1) and 9.5 grams (0.041 mol) of diphenylacetyl chloride in 200 ml. of dry benzene was refluxed for 3 hours. The benzene was then distilled off, the residual gum was made alkaline with aqueous sodium carbonate and extracted with ether. The ether extract was washed with water, dried with sodium sulfate and the ether distilled off. The residual oil, comprising $N^2,N^2$-diethyl-$N^1$-diphenylacetyl - $N^1$ - [1 - methyl - 3 - (2,6,6 - trimethyl-1-cyclohexen-1-yl)propyl]ethylenediamine, was dissolved in 100 ml. of acetone containing 40% (by weight) of methyl bromide. The solution, after storage at room temperature for 48 hours, was evaporated to dryness and the residual yellow-colored gum was crystallized from ethyl acetate-petroleum ether. The methobromide of $N^2,N^2$ - diethyl - $N^1$ - diphenylacetyl - $N^1$ - [1 - methyl-3 - (2,6,6 - trimethyl - 1 - cyclohexen - 1 - yl)propyl]-ethylenediamine melted at 144–146° C.

Example 4

Four teaspoons of Raney nickel catalyst were added to a solution of 310 grams (1.5 mol) of 4-(2,6,6-trimethyl-1-cyclohexen-1-yl)-2-methylbuten-2-al-1 and 200 ml. of liquid ammonia in 800 ml. of methanol. The mixture was hydrogenated at 150° C. and 1500 p. s. i. The catalyst was filtered off, the excess ammonia and methanol were distilled off, and the residual oil was fractionated in vacuo to obtain 2-methyl-4-(2,6,6-trimethyl-1-cyclohexen-1-yl-butylamine, B.$_{1.3}$ 94° C., $n_D^{28}$=1.4850.

Example 5

A solution of 11.8 grams (0.04 mol) of $N^2,N^2$-diethyl-$N^1$ - [1 - methyl - 3 - (2,6,6 - trimethyl - 1 - cyclohexen-1-yl)propyl]ethylenediamine (obtained as in Example 1) and 9.5 grams (0.041 mol) of diphenylacetyl chloride in 200 ml. of dry benzene was refluxed for 3 hours. The benzene was distilled off, and the residual gum was made alkaline with aqueous sodium carbonate and extracted with ether. The ether extract was washed with water, dried with sodium sulfate and hydrogen bromide gas was passed in to Congo red acidity. The ether was distilled off and the residual $N^2,N^2$-diethyl-$N^1$-diphenylacetyl-$N^1$- [1 - methyl - 3 - (2,6,6 - trimethyl - 1 - cyclohexen - 1-yl)propyl]ethylenediamine hydrobromide, m. p. 180-181° C., was crystallized from ethanol-ether.

Example 6

20 grams (0.035 mol) of $N^2,N^2$-diethyl-$N^1$-diphenylacetyl - $N^1$ - [1 - methyl - 3 - (2,6,6 - trimethyl - 1 - cyclohexen-1-yl)propyl]ethylenediamine hydrobromide (obtained as in Example 5) was suspended in water, excess sodium carbonate was added and the well stirred mixture was extracted with ether. The ether extract was washed with water, dried with sodium sulfate and the ether was distilled off. The residual oil was dissolved in 100 ml. of acetonitrile, 7.6 grams (0.035 mol) of p-nitrobenzyl bromide were added and the solution was refluxed for 24 hours. The solution was cooled, the volatiles were distilled off and the residual gum crystallized from ethanol-ether. The $N^2$-p-nitrobenzyl bromide of $N^2,N^2$ - diethyl - $N^1$ - diphenylacetyl - $N^1$ - [1 - methyl-3 - (2,6,6 - trimethyl - 1 - cyclohexen - 1 - yl)propyl]ethylenediamine melted at 127–128° C.

Example 7

206 grams (1 mol) of 4-(2,6,6-trimethyl-1-cyclohexen-1-yl)-2-methylbuten-2-al-1 and 120 grams (1.03 mol) of β-diethylaminoethylamine, dissolved in 400 ml. of ethanol, were hydrogenated in the presence of Raney nickel catalyst at 1500 p. s. i. and 150° C. The catalyst was filtered off, the alcohol distilled off and the residual oil fractionated in vacuo, to give $N^1$-[2-methyl-4-(2,6,6-trimethyl - 1 - cyclohexen - 1 - yl)butyl] - $N^2,N^2$ - diethylethylenediamine, B.$_{0.07}$ 140° C., $n_D^{25}$=1.4783.

An aliquot of the above, when treated with an acetone solution of oxalic acid, gave the crystalline dioxalate which (after recrystallization from water-methanol-acetone) melted at 201–202° C. with decomposition.

Example 8

To 61.6 grams (0.2 mol) of $N^1$-[2-methyl-4-(2,6,6-trimethyl - 1 - cyclohexen - 1 - yl)butyl] - $N^2,N^2$ - diethylenediamine dissolved in 26 ml. (0.5 mol) of 90% formic acid was added 19 ml. (0.22 mol) of 35% formaldehyde. The solution was stirred on a steam bath for 3 hours, and the excess formaldehyde and formic acid were distilled off. The residual oil was made strongly alkaline with 30% sodium hydroxide and extracted with ether. The ether extract was washed with water, dried with potassium carbonate and the ether was then distilled off. The residual oil was fractionated in vacuo to give $N^1$-methyl-$N^1$ - [2 - methyl - 4 - (2,6,6-trimethyl - 1 - cyclohexen-1-yl)butyl] - $N^2,N^2$-diethylenediamine, B.$_{0.07}$ 134° C., $n_D^{27}$=1.4770.

An aliquot of the compound obtained above was treated with an acetone solution of oxalic acid. The dioxalate thus obtained was recrystallized from methanol-acetone and melted at 183–184° C. with decomposition.

Example 9

16 grams (0.05 mol) of $N^1$-methyl-$N^1$-[2-methyl-4-(2,6,6 - trimethyl - 1 - cyclohexen - 1 - yl)butyl] - $N^2,N^2$-diethylethylenediamine (obtained as in Example 8) was treated with 100 ml. of acetone containing 40% methyl bromide (by weight). The solution, after storage at room temperature for 48 hours, was evaporated to dryness and the residual gum was crystallized from isopropanol-ether. The dimethobromide of $N^1$-methyl-$N^1$-[2-methyl - 4 - (2,6,6 - trimethyl - 1 - cyclohexen - 1 - yl)-butyl]-$N^2,N^2$-diethylethylenediamine sesquihydrate melted at 65–66° C. (sinters at 61° C.)

Example 10

Two teaspoons of Raney nickel catalyst were added to a solution of 38.4 grams (0.2 mol) of β-ionone and 23 grams (0.2 mol) of 3-dimethylaminopropylamine in 150 ml. of ethanol. The mixture was hydrogenated at 150° C. and 1500 p. s. i. The catalyst was filtered off, the ethanol was distilled off and the residual oil was fractionated in vacuo to obtain $N^1$-[1-methyl-3-(2,6,6-trimethyl - 1 - cyclohexen - 1 - yl)propyl] - $N^2,N^2$ - dimethyl-1,3-propanediamine, B.$_{0.1}$ 120° C., $n_D^{26}$=1.4743.

An aliquot, when treated with an acetone solution of oxalic acid, gave the crystalline dioxalate hemihydrate which, after recrystallization from 95% ethanol, melted at 172–173° C. with decomposition.

Example 11

38.4 grams (0.2 mol) of β-ionone and 26 grams (0.2 mol) of 3-diethylaminopropylyamine were reacted according to the procedure described in Example 10 to obtain $N^1$ - [1 - methyl - 3 - (2,6,6 - trimethyl - 1 - cyclohexen - 1 - yl)propyl] - $N^2,N^2$ - diethyl - 1,3 - propanediamine, B.$_{0.08}$ 122–125° C., $n_D^{26}$=1.4715.

An aliquot, when treated with an acetone solution of oxalic acid, gave the crystalline dioxalate which, after recrystallization from water-acetonitrile, melted at 178–179° C. with decomposition.

Example 12

39 grams (0.2 mol) of 1-methyl-3-(2,6,6-trimethyl-1-cyclohexen-1-yl)propylamine, 25 grams (0.14 mol) of 3-dipropylaminopropyl chloride and 29.6 grams (0.28 mol) of anhydrous sodium carbonate were suspended in 150 ml. of ethanol. The mixture was stirred and refluxed for 22 hours, cooled, and the solids filtered off. The filtrate was concentrated to remove the ethanol and the resulting residual oil fractionated in vacuo to obtain $N^1$ - [1 - methyl - 3 - (2,6,6 - trimethyl - 1 - cyclohexen-1 - yl)propyl] - $N^2,N^2$ - dipropyl - 1,3 - propanediamine, B.$_{0.09}$ 150–155° C., $n_D^{26}$=1.4752.

An aliquot, when treated with an acetone solution of oxalic acid, gave the crystalline dioxalate which, after recrystallization from 95% ethanol, melted at 170–172° C. with decomposition.

Example 13

38.4 grams (0.2 mol) of β-ionone and 37.2 grams (0.2 mol) of 3-dibutylaminopropylamine were reacted in the manner described in Example 10 to obtain $N^1$-[1-methyl - 3 - (2,6,6-trimethyl-1-cyclohexen-1-yl)propyl]-$N^2,N^2$-dibutyl-1,3-propanediamine, B.$_{0.06}$ 150–153° C., $n_D^{28}$=1.4728.

An aliquot, when treated with an acetone solution of oxalic acid, gave the crystalline dioxalate which, after

Example 14

38.4 grams (0.2 mol) of β-ionone and 28.4 grams (0.2 mol) of N-aminopropyl morpholine were reacted according to the method described in Example 10 to produce N - [1 - methyl-3-(2,6,6-trimethyl-1-cyclohexen-1 - yl)propyl]-3-(4-morpholinyl)propylamine, B.$_{0.08}$ 155–158° C., $n_D^{26}$=1.4859.

An aliquot, when treated with an acetone solution of oxalic acid, gave the crystalline dioxalate which, after recrystallization from 80% ethanol, melted at 186–187° C. with decomposition.

Example 15

39 grams (0.2 mol) of 1-methyl-3-(2,6,6-trimethyl-1-cyclohexen-1-yl)-propylamine and 22 grams (0.14 mol) of 3-piperidinopropyl chloride were reacted according to the procedure described in Example 12 to produce N-[1 - methyl - 3 - (2,6,6 - trimethyl - 1 - cyclohexen - 1 - yl)-propyl]-3-(1-piperidyl)propylamine, B.$_{0.07}$ 140–145° C., $n_D^{25}$=1.4908.

An aliquot, when treated with an acetone solution of oxalic acid, gave the crystalline dioxalate hemihydrate which melted at 187–188° C. after recrystallization from 95% ethanol-ether.

Example 16

29.2 grams (0.15 mol) of 1-methyl-3-(2,6,6-trimethyl-1-cyclohexen-1-yl)-propylamine and 20 grams (0.15 mol) of 3-diethylamino-2,2-dimethylpropionaldehyde were reacted in the manner described in Example 10 to obtain $N^2,N^2$ - diethyl - 2,2 - dimethyl - $N^1$ - [1 - methyl - 3 - (2,6,6 - trimethyl - 1 - cyclohexen-1-yl)-propyl]-1,3-propanediamine, B.$_{0.01}$ 100–130° C., $n_D^{25}$=1.4722.

An aliquot, when treated with an acetone solution of oxalic acid, gave the crystalline dioxalate hemihydrate, M. P. 120–123° C. (recrystallized from methanol-acetone-ether).

Example 17

188 grams (0.9 mol) of 2-methyl-4-(2,6,6-trimethyl-1-cyclohexen-1-yl)butylamine (obtained as in Example 4), 86.5 grams (0.6 mol) of β-dimethylaminoethyl chloride hydrochloride and 127 grams (1.2 mol) of anhydrous sodium carbonate were reacted according to the method described in Example 12 to obtain $N^1$-[2-methyl-4 - (2,6,6-trimethyl - 1 - cyclohexen - 1 - yl)butyl] $N^2,N^2$-dimethylethylenediamine, B.$_{0.03}$ 123–125° C., $n_D^{25}$=1.4809.

An aliquot, when treated with an acetone solution of oxalic acid, gave the crystalline dioxalate which melted at 219–220° C. with decomposition (upon recrystallization from water).

Example 18

41.2 grams (0.2 mol) of 4-(2,6,6-trimethyl-1-cyclohexen-1-yl)-2-methylbuten-2-al-1 and 23 grams (0.2 mol) of 3-dimethylaminopropylamine were reacted in the manner described in Example 10 to produce $N^1$-[2-methyl - 4 - (2,6,6 - trimethyl-1-cyclohexen-1-yl)butyl]-$N^2,N^2$-dimethyl-1,3-propanediamine, B.$_{0.1}$ 130–133° C., $n_D^{26}$=1.4772.

An aliquot, when treated with an acetone solution of oxalic acid, gave the crystalline dioxalate which, after recrystallization from 80% ethanol-ethanol, melted at 201–203° C. with decomposition.

Example 19

To 9.1 grams (0.03 mol) of $N^1$-[2-methyl-4-(2,6,6-trimethyl - 1 - cyclohexen - 1 - yl)butyl]$N^2,N^2$ - dimethyl-1,3-propanediamine (obtained as in Example 18) dissolved in 6 ml. (0.1 mol) of 90% formic acid, were added 3 ml. (0.034 mol) of 35% formaldehyde. The solution was stirred on a steam bath for 3 hours, and the excess formaldehyde and formic acid were distilled off. The residual oil was made strongly alkaline with 30% sodium hydroxide and extracted with ether. The ether extract was washed with water, dried with potassium carbonate and the ether distilled off. The residual oil was treated with an acetone solution of oxalic acid and the $N^1$ - methyl - $N^1$ - [2 - methyl - 4 - (2,6,6-trimethyl - 1 - cyclohexen - 1 - yl)butyl] - $N^2,N^2$ - dimethyl - 1,3 - propanediamine dioxalate thus obtained, following recrystallization from methanol, melted at 190–191° C. with decomposition.

Example 20

41.2 grams (0.2 mol) of 4-(2,6,6-trimethyl-1-cyclohexen - 1 - yl) - 2 - methylbuten - 2 - al - 1 and 26 grams (0.2 mol) of 3-diethylaminopropylamine were reacted according to the method described in Example 10 to produce $N^1$ - [2 - methyl - 4 - (2,6,6 - trimethyl - 1 - cyclohexen - 1 - yl)butyl] - $N^2,N^2$ - diethyl - 1,3 - propanediamine, B.$_{0.1}$ 145–147° C., $n_D^{26}$=1.4778.

An aliquot, when treated with an acetone solution of oxalic acid, gave the crystalline dioxalate which, upon recrystallization from 80% ethanol-ethanol, melted at 182–183° C. with decomposition.

Example 21

9.7 grams (0.3 mol) of $N^1$-[2-methyl-4-(2,6,6-trimethyl - 1 - cyclohexen - 1 - yl) - butyl] - $N^2,N^2$ - diethyl-1,3-propanediamine (obtained as in Example 20), 6 ml. (0.1 mol) of 90% formic acid and 3 ml. (0.034 mol) of 35% formaldehyde were reacted as described in Example 19 to obtain $N^1$-methyl-$N^1$-[2-methyl-4-(2,6,6-trimethyl - 1 - cyclohexen - 1 - yl)butyl] - $N^2,N^2$ - diethyl-1,3-propanediamine dioxalate which, following recrystallization from water-ethanol, melted at 198–199° C. with decomposition.

Example 22

25 grams (0.14 mol) of 3-dipropylaminopropyl chloride and 42 grams (0.2 mol) of 2 - methyl - 4-(2,6,6 - trimethyl - 1 - cyclohexen - 1 - yl)butylamine obtained as in Example 4) were reacted in the manner described in Example 12 to produce $N^1$-[2-methyl-4-(2,6,6-trimethyl - 1 - cyclohexen - 1 yl)butyl] - $N^2,N^2$ - dipropyl-1,3-propanediamine, B.$_{0.3}$ 160° C., $n_D^{26}$=1.4778.

An aliquot, when treated with an acetone solution of oxalic acid, gave the crystalline dioxalate which, after recrystallization from water-ethanol, melted at 200–202° C. with decomposition.

Example 23

41.2 grams (0.2 mol) of 4-(2,6,6-trimethyl-1-cyclohexen-1-yl)-2-methylbuten-2-al-1 and 37.2 grams (0.2 mol) of 3-dibutylaminopropylamine were reacted according to the procedure described in Example 10 to produce $N^1$ - [2 - methyl - 4 - (2,6,6 - trimethyl - 1 - cyclohexen - 1 - yl)butyl] - $N^2,N^2$ - dibutyl - 1,3 - propanediamine, B.$_{0.06}$ 155–158° C., $n_D^{28}$=1.4758.

An aliquot, when treated with an acetone solution of oxalic acid, gave the crystalline dioxalate which, following recrystallization from 60% ethanol, melted at 187–188° C. with decomposition.

Example 24

42 grams (0.2 mol) of 2- methyl-4-(2,6,6-trimethyl-1-cyclohexen-1-yl)butyl-amine (obtained as in Example 4) and 28.4 grams (0.18 mol) of dimethylaminoisopropyl chloride hydrochloride were reacted in the manner described in Example 12 to obtain $N^1$-[2-methyl-4-(2,6,6-trimethyl - 1 - cyclohexen - 1 - yl)butyl] - 2 - dimethylaminoisopropylamine, B.$_{0.2}$ 140–150° C., $n_D^{28}$=1.4793.

An aliquot, when treated with an acetone solution of oxalic acid, gave the crystalline dioxalate which melted at 198–199° C. with decomposition (recrystallized from water-acetonitrile).

Example 25

41.2 grams (0.2 mol) of 4-(2,6,6-trimethyl-1-cyclohexen-1-yl)-2-methyl-buten-2-al-1 and 31.2 grams (0.2 mol) of 5-diethylamino-2-aminopentane were reacted in the manner described in Example 10 to produce $N^1,N^1$-diethyl - 4 - methyl - $N^4$ - [2 - methyl - 4 - (2,6,6 - trimethyl - 1 - cyclohexen - 1 - yl)butyl] - 1,4 - butanediamine, B.$_{0.07}$ 142° C., $n_D^{25}$=1.4783.

An aliquot, when treated with an acetone solution of oxalic acid, gave the crystalline dioxalate which, following recrystallization from 95% ethanol, melted at 168–170° C. with decomposition.

Example 26

10.3 grams (0.03 mol) of $N^1,N^1$-diethyl-4-methyl-$N^4$-[2 - methyl - 4 - (2,6,6 -trimethyl - 1 - cyclohexen - 1 - yl)-butyl]-1,4-butanediamine (obtained in Example 25), 6 ml. (0.1 mol) of 90% formic acid and 3 ml. (0.034 mol) of 35% formaldehyde were reacted as described in Example 19 to produce $N^1,N^1$-diethyl-$N^4$-methyl-$N^4$-[2-methyl-4-(2,6,6 - trimethyl - 1 - cyclohexen - 1 - yl)butyl] - 1,4 - pentanediamine dioxalate, M. P. 138–140° C. (recrystallized from ethanol-acetone).

Example 27

31.3 grams (0.15 mol) of 2-methyl-4-(2,6,6-trimethyl-1-cyclohexen-1-yl)-butylamine (obtained as in Example 4) and 20 grams (0.15 mol) of 3-diethylamino-2,2-dimethylpropionaldehyde were reacted according to the procedure described in Example 10 to produce $N^2,N^2$-diethyl - 2,2 - dimethyl - $N^1$ - [2 - methyl - 4 - (2,6,6 - trimethyl - 1 - cyclohexen - 1 - yl)butyl] - 1,3 - propanediamine, B.$_{0.07}$ 135–145° C., $n_D^{27}$=1.4751.

An aliquot, when treated with an acetone solution of oxalic acid, gave the crystalline dioxalate which melted at 144–145° C. upon recrystallization from ethanol.

Example 28

62.6 grams (0.3 mol) of 2-methyl-4-(2,6,6-trimethyl-1-cyclohexen-1-yl)-butylamine (obtained as in Example 4) and 32.3 grams (0.2 mol) of 3-piperidino-propyl chloride were reacted in the manner described in Example 12 to obtain $N^1$-[2-methyl-4-(2,6,6-trimethyl-1-cyclohexen-1-yl)butyl]-3-(1-piperidyl)propylamine, B.$_{0.6}$ 165–170° C., $n_D^{26}$=1.4939.

An aliquot, when treated with an acetone solution of oxalic acid, gave the crystalline dioxalate which melted at 187–189° C. with decomposition (recrystallized from water-ethanol).

Example 29

41.2 grams (0.2 mol) of 4-(2,6,6-trimethyl-1-cyclohexen-1-yl)-2-methylbuten-2-al-1 and 28.4 grams (0.2 mol) of N-aminopropylmorpholine were reacted according to the method described in Example 10 to produce N - [2 - methyl - 4 - (2,6,6-trimethyl - 1 - cyclohexen-1-yl)butyl]-3-(4-morpholinyl)propylamine, B.$_{0.1}$ 157–160° C., $n_D^{25}$=1.4877.

An aliquot, when treated with an acetone solution of oxalic acid, gave the crystalline dioxalate which, following recrystallization from methanol, melted at 171–173° C. with decomposition.

Example 30

10 grams (0.03 mol) of N-[2-methyl-4-(2,6,6-trimethyl-1 - cyclohexen - 1 - yl) - butyl] - 3 - (4 - morpholinyl)-propylamine (obtained as in Example 29), 6 ml. (0.1 mol) of 90% formic acid and 3 ml. (0.034 mol) of 35% formaldehyde were reacted according to the method described in Example 19 to obtain N-methyl-N-[2-methyl-4-(2,6,6-trimethyl - 1 - cyclohexen - 1 - yl)butyl] - 3 - (4 - morpholinyl)propylamine dioxalate, M. P. 197–198° C. with decomposition (recrystallized from 80% ethanol).

The following additional compounds may be synthesized according to the procedure described in Example 12:

N - [1 - methyl - 3 - (2,6,6 - trimethyl - 1 - cyclohexen-1-yl)propyl]-3-(1-pyrrolidyl)-propylamine.

N - [1 - methyl - 3 - (2,6,6 - trimethyl - 1 - cyclohexen-1-yl)propyl]-2-(1-piperidyl)-ethylamine.

N - [2 - methyl - 4 - (2,6,6 - trimethyl - 1 - cyclohexen-1-yl)butyl]-3-(1-pyrrolidyl)-propylamine.

N - [2 - methyl - 4 - (2,6,6 - trimethyl - 1 - cyclohexen-1-yl)butyl]-2-(1-piperidyl)-ethylamine.

We claim:

1. A compound having the formula

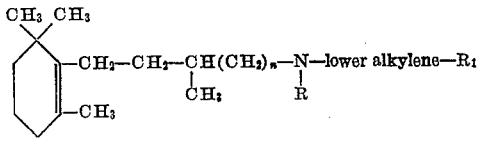

wherein R is a member of the group consisting of hydrogen, alkyl and acyl, $R_1$ is a tertiary amino group, and $n$ represents a member of the group consisting of 0 and 1 and salts thereof.

2. A compound having the formula

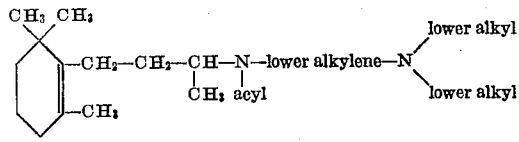

and salts thereof.

3. $N^2,N^2$ - diethyl - $N^1$ - [1 - methyl - 3 - (2,6,6 - trimethyl - 1 - cyclohexen - 1 - yl)propyl]ethylenediamine and salts thereof.

4. $N^2$-p-nitrobenzylbromide of $N^2,N^2$-diethyl-$N^1$-diphenylacetyl - $N^1$ - [1 - methyl - 3 - (2,6,6 - trimethyl-1-cyclohexen-1-yl)propyl]ethylenediamine.

5. $N^1$ - [2 - methyl - 4 - (2,6,6 - trimethyl - 1 - cyclohexen - 1 -yl)butyl] - $N^2,N^2$ - diethylethylenediamine and the salts thereof.

6. $N^1$ - [2 - methyl - 4 - (2,6,6 - trimethyl - 1 - cyclohexen - 1 - yl)butyl] - $N^2,N^2$ - diethylethylenediamine dioxalate.

7. $N^1$ - methyl - $N^1$ - [2 - methyl - 4 - (2,6,6 - trimethyl-1 - cyclohexen - 1 - yl)butyl] - $N^2,N^2$ - diethylethylenediamine and salts thereof.

8. $N^1$ - methyl - $N^1$ - [2 - methyl - 4 - (2,6,6 - trimethyl-1 - cyclohexen - 1 - yl)butyl] - $N^2,N^2$ - diethylethylenediamine dioxalate.

No references cited.